Sept. 29, 1970 E. T. HUMBY 3,531,129
PICKUP-DEPOSITING MECHANISM IN GRAMOPHONE RECORD PLAYERS
Filed Aug. 13, 1968
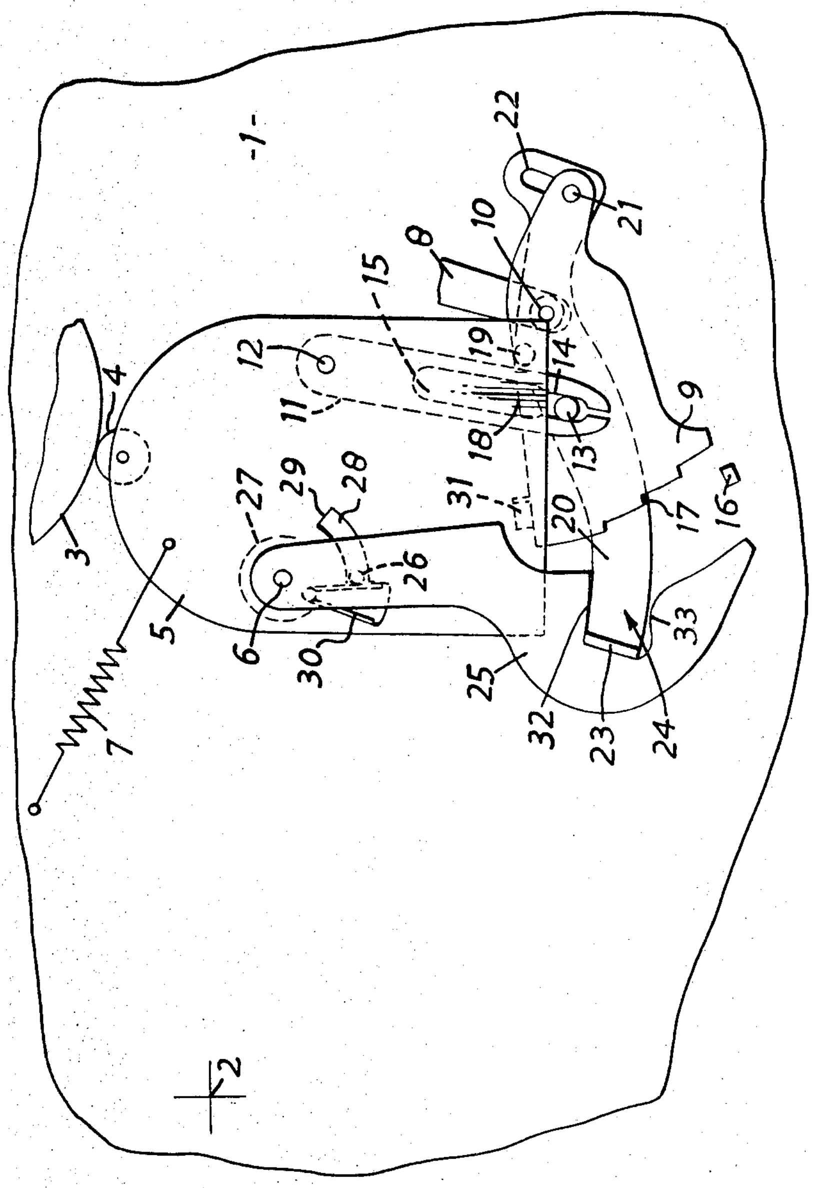

United States Patent Office 3,531,129
Patented Sept. 29, 1970

3,531,129
PICKUP-DEPOSITING MECHANISM IN
GRAMOPHONE RECORD PLAYERS

Edward Thomas Humby, Ilford, England, assignor to The Plessey Company Limited, Ilford, England, a British company Filed Aug. 13, 1968, Ser. No. 752,239
Claims priority, application Great Britain, Sept. 1, 1967, 40,056/67
Int. Cl. G11b *17/06*
U.S. Cl. 274—15 7 Claims

ABSTRACT OF THE DISCLOSURE

To prevent inward skating of the pickup stylus when deposited between the turns of the lead-in groove of a record, the pickup arm is held frictionally against movement after deposition of the pickup onto the record for a period sufficient to ensure engagement of the stylus with the lead-in groove. Preferably the frictional restraining element is, after pickup deposition, moved for a short distance in a direction tending to move the pickup away from the turntable centre, thus shortening the maximum time until the groove is met and providing a slight impulse tending to counteract initial skating.

BACKGROUND OF THE INVENTION

This invention relates to gramophone record players of the kind in which a pickup is carried on a pickup arm mounted on a bracket, hereinafter called pickup plate, that is pivotally movable about a vertical axis, the record player having an automatic record-changing mechanism including means which deposit the pickup stylus on a predetermined or selected point of a record to be played, and which, after termination of the play of a record, automatically lift the pickup and move it away from the centre of the record turntable to clear the path for a further record to be played on the turntable, whereafter the pickup is automatically moved inwardly again, preferably to a point automatically selected in accordance with the size of the said further record, before the pickup stylus is lowered into one of the initial turns of the recording groove, or generally into a lead-in groove forming an external extension of the recording groove proper, of the record to be played. Such record players will hereinafter be referred-to as record changers of the kind specified.

In the use of such record changers it has been found that there is a risk that the stylus, after being deposited on the record, will move towards the centre of the record at a higher speed than that corresponding to the recording groove or lead-in groove, a phenomenon known as "skating," with consequent risk of damage to the record. It is also known that since the pickup arm is pivoted about a vertical axis outside the edge of the turntable, a so-called skating force is created due to the angle formed between the radius from this pivot axis to the stylus and a tangent to the record groove at its point of engagement by the stylus, and various means have already been proposed to compensate for this skating force. It has however been found even when such means are used that there remains a risk of skating almost immediately after the stylus has been deposited on the record, and it is an object of the present invention to counteract the occurrence of such skating.

We have ascertained as a cause of such skating the fact that, as the stylus is deposited, there is a likelihood that its point will reach the record between two of the turns of the lead-in groove. When this happens, the stylus is free to move freely inwardly or outwardly, and since many records are arranged to increase in thickness near their outer edge in order to provide a supporting rim, the resultant inward inclination of the surface containing the lead-in groove is liable to cause the pickup with the stylus to start moving rapidly towards the centre of the record, and when during this movement the first groove is encountered, the pickup may have gathered sufficient impetus for the stylus to travel across the groove and continue its movement, with consequent risk of damage to the adjacent recording grooves.

Moreover, in order to ensure accuracy of the starting position, it is usual to subject the pickup arm to a frictional braking force until the arm-lifting element has returned to its normal position.

When several records have been played, the build-up in height of the stack of records on the turntable will cause the pickup stylus to engage the top record during the downward movement of the arm-lifting element well before this element has reached its normal position. If the stylus is deposited into the lead-in groove of such a record, the groove will, before the friction brake is released, have moved the stylus point some distance towards the turntable axis, and while this will be permitted by built-in compliance, it will accumulate in the structure an appreciable amount of elastic energy, the subsequent sudden release of which may also initiate inward skating. The present invention has for a more specific object to reduce tendency to inward skating and to ensure reliable engagement of the stylus with the groove before the pickup arm is released for free inward movement.

SUMMARY OF THE INVENTION

According to a broad aspect of the invention the pickup arm is, after being deposited on a record to be played, actuated in such manner, preferably through a friction connection, as to move the pickup relative to the point of intersection of the turntable radius through the stylus point with the turns of the lead-in groove of the record, by at least the maximum standard lead-in-groove pitch in the direction away from the turntable axis and is then restrained to a controlled maximum rate of movement in the opposite direction towards the turntable axis, said maximum rate being in excess of the rate of movement imparted to the pickup stylus by the lead-in groove of the record, so as to controlledly release any accumulated resilient energy of the pickup and arm structure tending to accelerate the arm towards the turntable axis, before the pickup arm is freed from restraint to play the record.

Preferably the pickup arm is, after its deposition, given freedom to move a short distance, for example one half of the maximum standard pitch of the lead-in groove, in either direction during a fraction, for example one half, of a revolution of the turntable, and is then, if during that fraction it has moved towards the turntable centre, constrained to move outwardly to resume, by the end of that revolution a position substantially identical with its original set-down position, and is thereafter for a suitable period, for example a further half revolution, restrained in its subsequent movement towards the turntable axis to a controlled maximum rate in excess of the rate which would be produced by following a lead-in groove of maximum standard pitch, in order to release any inwardly directed resilient forces, whereafter the pickup arm is freed from restraint for the playing of the record.

In so-called record changers outward and subsequent inward movement at the end of each playing cycle is normally applied to the pickup by a bracket, hereinafter referred-to as pickup plate, which is connected with the pickup arm for common rotation therewith about a vertical pivot axis, and accordingly to a more specific aspect of the invention an element, hereinafter referred-to as friction arm, is pivoted about the same axis as the pickup plate and is frictionally coupled to the pickup plate so as to normally move jointly therewith about the pivot axis while permitting relative pivotal movement of the two when a force sufficient to overcome the friction is applied, and this friction arm is arranged to be placed in a predetermined position by the time the pickup arm has reached the outermost point of its movement and is then held locked against movement in either direction during the inward positioning movement of the pickup arm until the pickup-lifting element has substantially returned to its normal position in order to deposit the pickup stylus onto the record and is thereafter arranged to move in a direction corresponding to movement of the pickup away from the turntable axis, this movement being in the opposite direction at least relative to the movement which engagement with the groove would impart to the pickup, for a distance relative to a standard lead-in groove corresponding to one pitch or slightly more than one pitch of the groove, so that even when the stylus is originally deposited just at the outer side of a groove, it will, before the restraint by the friction arm is removed, have reached and entered the groove, as a result of its own outward travel relative to the groove, at a point of the groove spaced not more than one turn along the groove from this point. Thereafter the stylus will follow the groove, utilising the compliance of the pickup and/or of the mechanism. As a result, at the moment when the restraint is removed from the friction arm and thus from the pickup, the stylus is securely guided by the groove, which it has entered without any appreciable radial velocity, and which from the moment of release of the restraint will securely guide the stylus into the recording groove proper.

When the invention is applied to a record changer of the kind in which the movement of the pickup plate is produced by a member driven by the record changing mechanism to perform one reciprocation about a pivot for each changing cycle and hereinafter called drive plate, the restraint is preferably applied to the friction arm by a lever, hereinafter called stabilising lever, which is pivoted about the same axis as the reciprocating drive plate. This stabilising lever may be driven, with suitable backlash, by this drive plate, and may have a generally arcuate open-ended slot adapted to embrace a lug on the friction arm when the lug, during the outward movement of the pickup arm, reaches a position of coincidence with this slot, a resilient coupling member being interposed between the drive plate and the stabilising lever which permits the drive plate to complete its movement after the lug has reached the bottom of the slot. When then the direction of the movement of the drive plate is reversed, the lost motion in its connection to the drive plate will permit the stabilising lever to remain in this fully locked position until the inward positioning movement of the tone arm is completed and the stylus has been lowered into engagement with the record; then the stabilising lever will begin to move with the drive plate. During the part of this movement available for placing the pickup in the starting position over the record and subsequently lowering it into engagement with the starting groove of the record the lug of the friction lever will remain trapped in the bottom of the open-ended slot. This slot widens from the bottom sufficiently to allow the pickup arm, when the drive plate starts to move the stabilising lever, a small amount of inward or outward movement, corresponding to not more than one half of the maximum standard pitch of a lead-in groove in either direction. After the widest point of the slot has been reached the stabilising lever will during the next-following half-revolution of the turntable continue its outward movement, and in the portion of the slot thus moved past the lug during this period, the operative point of that edge of the slot which limits the inward movement of the pickup arm, is arranged to approach the pivot axis of the stabilising lever by an amount causing movement of the friction arm and the pickup plate, by an angle corresponding to an outward movement of the pickup stylus by one half of the maximum pitch of a standard lead-in groove, or in present practice an outward movement of $\frac{1}{32}$ of an inch. Since during the said half-revolution of the record the intersection of any particular turn of the lead-in groove with the turntable radius containing the stylus point will itself advance towards the centre of the record by one half-pitch of the lead-in groove, which is also $\frac{1}{32}$ of an inch, it will be appreciated that during this half-revolution the pickup, and thus the point of the stylus unless retained in a groove, will move away from the turntable axis, and thus approach the next adjacent turn of the lead-in groove initially located outwardly of the stylus, by $\frac{1}{16}$ of an inch or by a full maximum pitch of the lead-in groove, thus ensuring reliably that during this part of the movement, during which the pickup is still restrained by the stabilising lever against inward movement, the stylus will have reached the groove and begun to be guided by it.

It should however be appreciated that, should the pickup stylus happen to be deposited initially within the lead-in groove, or, more particularly in the case of a record deposited on top of a stack of records already on the turntable, have encountered the lead-in groove before the unlocking movement of the stabilising lever begins, this enforced outward swinging movement of the pickup plate, and/or its preceding locking against movement, in conjunction with the pitch of the lead-in groove, will by this time have caused the pickup stylus point to have advanced towards the turntable centre from the position in which it was originally deposited, utilising the resilient compliance provided in the pickup and arm structure, and that, if the pickup plate were now suddenly released, this stored-up resilient energy would apply to the arm an appreciable impetus towards the turntable centre and thus provoke an appreciable risk of skating. In order to release this stored energy in a controlled manner and thus to counteract this risk, the controlling edge of the stabilising lever is continued beyond the point at which it has completed imparting to the arm an outward movement and is, in its part preceding the point of disengagement, so shaped as to limit the inward movement of the pickup arm produced by any stored-up resilient energy to a rate which, though somewhat in excess of the rate at which the pickup would be moved by following a maximum-pitch standard lead-in groove, does not exceed the latter sufficiently to permit the creation of sufficient kinetic energy to initiate skating.

It will also be appreciated that while the preceding statement it has been assumed that the control edge forms one edge of a slot in the stabilising lever, the same results can alternatively be obtained if the slot of the stabilising lever is replaced by a smiliarly curved "tail" which is guided between two upstanding lugs of the friction arm, or, as a further alternative a lug on the stabilising lever could engage a suitably shaped slot in the friction arm.

BRIEF DESCRIPTION OF THE DRAWING

The accompanying drawing illustrates one embodiment and is a perspective underneath scrap view showing the relevant parts, with a record-changer gramophone turntable arrangement indicated schematically.

DESCRIPTION OF THE PREFERRED EMBODIMENT

Referring now to the drawing, a gramophone base plate is indicated at 1, while 2 indicates the turntable axis. A so-called cycling cam 3, is in a known manner, arranged to perform a single revolution for each record-changing cycle, its movement being initiated when at the end of a play of a record the pickup stylus reaches the running-out groove. The cam 3 co-operates with a cam-follower roller 4 which is mounted on a drive plate 5 which forms an element of a pickup-actuating mechanism described further below and is pivoted at 6 on the base plate 1, a tension spring 7 being provided to urge the follower 4 into contact with the cam 3. A pickup arm 8, at the reverse side of the base plate 1, is mounted in a pickup-support structure mainly constituted by a plate 9, hereinafter referred-to as pickup plate, for joint pivotal movement about a pin 10 secured in the gramophone base plate. The pickup plate 9 is coupled to the drive plate 5 by a slotted link 11, which is pivoted at one end to a pin 12 on the drive plate 5, while its slot 15 embraces a coupling pin 13 projecting from the pickup plate 9. When the parts are in the illustrated position corresponding to the end of the anticlockwise movement of the drive plate 5 which causes the pickup arm 8 to move away from turntable centre 2, the coupling pin 13 is clamped between the two sides of a narrow end portion 14 of the guide slot 15 of the coupling link 11, so that, when subsequently the cam 3 reverses the movement of the drive plate 5, causing it to move in a clockwise direction about its pivot pin 6, the link 11 will, due to its frictional engagement of the pin 13, turn the pickup plate 9 in an anticlockwise direction about the pivot 10, thus moving the pickup arm 8 towards the centre of the turntable until this movement is terminated by engagement of a selector stop 16 with a selected one of a number of steps 17 at the outer edge of the pickup plate 9. When such engagement has been effected, further clockwise movement of the drive plate 5 by the cam 3 will move the link 11 to slide with its slot 15 relative to the pin 13, causing the latter to enter into the wider main portion of the slot 15, in which the pin 13 is freely movable. A pickup-lifting pin 19, resting on a face-cam track of the plate 5, then reaches a descending portion 18 of the face cam (appearing as rising in the underneath view of the drawing), which allows the pickup to descend under gravity action and to be deposited on a record, this movement appearing in the drawing as an upward movement of the pickup plate 9 and pickup arm 8. In order to prevent this deposition, in conjunction with the freeing of the pin 13 from the coupling link 11, from resulting in a risk of skating, a guide element constituted by a friction arm 20 is pivoted about the same pin 10 on which the pickup-arm plate 9 is pivotally mounted and is movable, against slight friction, relative to the pickup plate 9. For this purpose a pin 21 on the pickup plate 9 extends through a slot 22 in the friction arm 20 in which it is movable against friction and which allows the friction arm 20 a limited amount of movement relative to the pickup plate, the opposing friction being arranged to be sufficiently small not to interfere with the drive of the pickup plate 9 by the coupling pin 13 when the latter is clamped in the narrow part 14 of the slot 15 in the coupling link. In the illustrated position an abutment portion constituted by an upstanding tab 23 of the friction arm 20 engages the bottom portion of an open-ended arcuate slot 24 in a lever 25 constituting a guide control element and hereinafter referred-to as pickup-stablising lever, which is independently pivoted, with the interposition of a friction washer 27, on the pivot pin 6 about which the drive plate 5 moves. The bottom portion of the arcuate slot 24 constitutes a locking means for the friction arm 20 since, due to this engagement of its tab 23 with the stabilising lever 25, the friction arm 20 is locked against movement about its pivot 10 and thus frictionally opposes movement of the pickup plate 9.

The pickup-stablising lever 25 has a coupling lug 26, by which it is lost-motion coupled with the drive plate 5, and which projects through an arcuate slot 28 of the drive plate 5. In this slot 28 the lug 26 is freely movable between one end 29 of the slot and a pre-loaded thrust-spring member 30, which forms a resilient coupling member or abutment at the other end of the arcuate slot.

The drawing, as already mentioned, illustrates the various elements in the positions which they assume at the moment of reversal of the movement of the drive plate 5, when the latter has reached the end of its anticlockwise movement (in the view of the drawing) about the pin 6, having moved the pickup arm 8 to the limit of its outward movement, determined by the abutment of an edge portion of the pickup plate 9 against a stationary stop 31, and having then forced the coupling pin 13 into the narrow part 14 of the slot 15. During the aproach of the drive plate 5 to this position, the tab 23 of the friction arm 20 has met the edge 32 of the slot 24 in the stabilising lever 25, thereby terminating the participation of the friction arm 20 in the movement of the pickup plate 9, and thereafter the coupling lug 26 of the stabilising lever 25 has been engaged by the preloaded thrust spring 30 which has moved the stabilising lever 25 into locking engagement of its slot 24 with the tab 23 of the friction arm 20. The resilience of the thrust spring 30 will then permit the completion of the anti-clockwise movement of the drive plate 5 even when the lug 23 has reached the bottom of the slot 24.

When now the drive plate 5 moves in a clockwise direction (in the view of the drawing), the frictional engagement of the coupling pin 13 in the narrow part 14 of the slot 15 of the coupling link 11 will move the pickup plate 9 in an anti-clockwise direction, thus causing the pickup arm to commence inward movement, while the friction arm 20 remains locked by engagement of its tab 23 with the slot 24 of the stablising lever 25 against participation in this movement. When the pickup arm 8 reaches the depositing position, which in a known manner has been selected according to the size of the record being played, the movement of the pickup plate 9 is terminated by engagement of the selector stop 16 with the appropriate step 17 of the pickup plate 9. Thereafter, as the drive plate 5 continues its clockwise movement, it forces the coupling pin 13 out of the narrow part 14 into the wider part of the slot 15, and when subsequently, during the lowering of the pickup into engagement with the record, the selector stop 16 is withdrawn, the pickup arm is free to move about the pivot 10 in either direction, except for the frictional restraint of the pickup plate 9 by the locked friction arm 20. At the moment when the pickup has reached its lowermost position, the rigid end 29 of the slot 28 in the drive plate 5 strikes the coupling lug 26 of the stablising lever 25, which is then moved in a clockwise direction about the pivot 6. In the bottom part of the slot 24 one of the edges of this slot is so inclined as to progressively allow the tab 23 a small amount of play as the lever 25 moves in a clockwise direction, but in a subsequently reached outer part the slot 24 narrows again due to the fact that one of its edges has a projecting cam portion 33 which during the further clockwise movement of the stabilising lever 25 will act on the tab 23 to impart a slight amount of clockwise movement to the friction arm 20, corresponding to an outward movement of the pickup stylus point of $\frac{1}{32}$ inch away from the turntable centre. This amount of movement is equal to one half of the maximum pitch of a standard record lead-in groove, and the dimensions of the stabilising lever 25 and its cam portion 33 are such that this outward movement takes place during one half of a revolution of the record turntable. After producing this outward movement, the cam edge 33 gradually recedes, thus permitting a controlled release of any resilient energy stored up in the pickup and arm due to advance of the stylus along the lead-in groove, and finally the edge 33 of slot 24 moves clear of the tab 23, thus freeing the pickup arm from all frictional restraint by the stabilising lever 5.

Since when the turntable rotates, a point of the lead-in groove moves inwardly at one pitch per revolution, it will be readily appreciated that during its above-mentioned outward movement the distance between the stylus point, unless engaged by a groove, and the nearest turn of the groove outwardly of the pickup point will decrease by one whole pitch during half a revolution of the turntable, so that during this half-revolution the pickup stylus point, unless previously so engaged, is certain to engage the lead-in groove, in which it will then on remain against the restraint imposed by the compliance of the stylus (or the frictional restraint of the friction lever, if this is the smaller) until the frictional restraint is removed in the manner referred-to.

It will be readily appreciated that various details of the invention may be modified without departing from the scope of the invention. Thus the invention, while primarily intended for gramophones having automatic record-changing equipment, may also be employed in other gramophones equipped with power-driven means for depositing the stylus on a record at a predetermined or selected distance from the turntable axis. Furthermore the coupling of the stabilising and friction levers could be effected by a tab on the former in engagement with cam guides on the latter.

The movement of the stabilising lever may, if desired, be obtained by separate cam means instead of it being lost-motion coupled to the drive plate.

What I claim is:

1. In a gramophone record changer having a rotatable record turntable for supporting a disc record having a spiral groove, a pickup arm which is at least adapted to carry a pickup equipped with a stylus and is mounted on a pickup-support structure including a pickup plate pivotally movable about a vertical axis, and automatic pickup-actuating mechanism so constructed as to lift the pickup after termination of the play of a record, and move it away from the axis of the turntable to allow another record to be placed on the turntable, to thereafter move the pickup towards said axis to a predetermined selected point, and then lower the pickup for engagement of such record by the pickup stylus, the combination comprising a guide element having an abutment portion and being arranged for joint movement with the pickup plate, at least during the period in which the pickup is lowered and subsequently released for free movement along such groove, a guide-control element driven by the pickup-actuating mechanism and having a cam face arranged to face and move across said abutment element during said period, said cam face including, in the direction of its said cross-wise movement, a first portion so shaped as to ensure mutual approach when the pickup stylus rests on such record and unless it is engaged in such groove, between the stylus and the turn of the groove next adjacent to the stylus at the outer side thereof, and a second portion so shaped as to permit movement of the stylus towards the centre of the turntable at a controlled rate higher than that produced by engagement of the stylus with a standard record lead-in groove.

2. A gramophone record player as claimed in claim 1, which includes friction means yieldably connecting said guide element with the pickup plate."

3. A gramophone record player as claimed in claim, 1 including complementary abutment means so associated with the guide element face as to allow the pickup, after its deposition, freedom to move a short distance in either direction during a fraction of a revolution of the turntable, the cam surface being so shaped that if during that fraction the pickup has moved towards the turntable centre, it is then constrained by said cam surface to move outwardly to resume, by the end of that revolution a position substantially identical with its original set-down position, and is thereafter for a period of the order of a further half revolution, restrained in its subsequent movement towards the turntable axis to a controlled maximum rate in excess of the rate which would be produced by following a lead-in groove of maximum standard pitch, in order to release any inwardly directed resilient forces, whereafter the pickup arm is freed from restraint for the playing of the record.

4. A gramophone record player as claimed in claim 1 wherein the guide element is formed by a friction arm which is also pivoted about said vertical axis and is frictionally coupled to the pickup plate so as to normally move jointly therewith about said axis while permitting relative pivotal movement of the two when a force sufficient to overcome the friction is applied, and which is actuated by the pickup actuating mechanism via a lost-motion connection to be placed in predetermined position by the time the pickup arm has reached the outermost point of its movement, said guide control element including locking means for the friction arm, and the combination including means for operating said guide-control element to then lock the friction arm against movement in either direction during the inward positioning movement of the pickup arm until the pickup-lifting element has substantially returned to its normal position in order to deposit the pickup stylus on to the record and for thereafter moving the guide-control element to release the friction arm.

5. A gramophone record player as claimed in claim 4, wherein said pickup-actuating mechanism includes a drive plate mounted for pivotal movement about an axis and means actuating said drive plate to perform on reciprocatory pivotal movement about said axis, such movement including a forward stroke beginning when the play of a record has been terminated and a return stroke completed before the playing of the next record commences, and wherein said guide-control element is constituted by a stabilising lever which is pivoted for movement about the same axis as said drive plate.

6. A gramophone record player as claimed in claim 5, wherein the friction arm has a lug and the stabilising lever has a generally arcuate open-ended slot adapted to embrace said lug, and said lug being arranged to reach during the outward movement of the pickup arm, a position of coincidence with this slot, the combination including a resilient coupling member so interposed in the lost-motion connection of the drive plate and the stabilising lever as to permit the drive plate to complete its movement after the lug has reached the bottom of the slot.

7. A gramophone record player as claimed in claim 5, wherein said locking means includes a slot in the stabilising lever which widens from the bottom sufficiently to allow the pickup arm, when the drive plate starts to move the stabilising lever, a small amount of inward or outward movement, corresponding to not more than one half of the maximum standard pitch of a lead-in groove in either direction.

References Cited

UNITED STATES PATENTS

| | | | |
|---|---|---|---|
| 3,385,603 | 5/1968 | Knopfle | 274—15 |
| 3,189,352 | 6/1965 | Scalera | 274—10 |
| 3,243,187 | 3/1966 | Caddy | 274—10 |
| 3,030,115 | 4/1962 | Hardy | 274—10 |

HARRY N. HAROIAN, Primary Examiner